United States Patent Office 3,364,156
Patented Jan. 16, 1968

3,364,156
RUBBER REINFORCED WITH CARBON
BLACK BLENDS
Gerard Kraus, Bartlesville, Okla., assignor to Phillips
Petroleum Company, a corporation of Delaware
No Drawing. Filed Aug. 12, 1965, Ser. No. 479,299
6 Claims. (Cl. 260—5)

ABSTRACT OF THE DISCLOSURE

The tear strength of vulcanized rubber is increased by reinforcing the rubber with a mixture of low structure acidic furnace carbon black and furnace carbon black of the type HAF, ISAF or SAF.

This invention relates to carbon black. In one aspect this invention relates to a blend of two different furnace carbon blacks. In another aspect this invention relates to a method for providing carbon black-reinforced rubber compositions having improved tear-resistant characteristics.

Heretofore it has been known that carbon black contributes so much to the desirable properties of vulcanized rubber that is is almost a universal compounding ingredient for quality stocks. The function of carbon black in rubber is commonly referred to as reinforcement, and numerous attempts have been made to identify reinforcement with one or more physical properties of the vulcanizate. To convey the generally accepted meaning of reinforcement, it is necessary to define it in terms of the properties of use. One general definition seems applicable; namely, reinforcement is the enhancement of one or more properties of an elastomer by the incorporation of some ingredient, thus making it more suitable for a given application. Carbon black is one type of reinforcement ingredient.

The rubber-grade carbon blacks can be grouped according to the processes by which they are manufactured which are as follows:

(1) Channel blacks
(2) Gas furnace blacks
(3) Oil furnace blacks
(4) Thermal blacks
(5) Acetylene blacks With the exception of acetylene black, all commercially available carbon blacks are made from natural gas, oil or a mixture of the two. It is conceivable that carbon black could be made from many other materials; but, at present, economic and technological factors limit the choice of raw materials to natural gas and oil except for the premium priced acetylene black.

Basically, carbon black is produced by subjecting a hydrocarbon-rich fuel to pyrolysis. The hydrocarbon is cracked to carbon black, hydrogen and minor amounts of tarry materials. If natural gas is the raw material and if no combustion takes place, a thermal black is produced; if acetylene is the raw material, the product is acetylene black. However, most carbon blacks are formed by conducting the pyrolysis in a flame or by subjecting it to a flame after the beginning of the pyrolysis. Under these conditions, much of the hydrogen and tarry materials are oxidized to water and oxides of carbon. The choice of fuel and the conditions under which the pyrolysis and combustion takes place determine the type of carbon black produced.

The subject invention relates only to those carbon blacks which are produced in large quantities from all feed stocks in carbon black producing furnaces. These blacks are referred to as furnace blacks. Prior to the advent of the furnace carbon blacks the major portion of the carbon black suitable for tire vulcanization was produced by the channel process. The rubber compounding art has advanced to a state such that the quality of the carbon black used in the compounding must be controlled within very narrow limits. It is this control of all of the desired properties of the carbon black that is oftentimes very difficult to achieve.

Despite the widespread and increasing use of oil furnace blacks in applications formerly served by channel black, there are some uses for which channel blacks are still regarded as superior by some persons skilled in the art. It is therefore desirable to furnish the art with an oil furnace black exhibiting properties in rubber comparable to those provided by channel black. This is particularly true in view of the fact that channel blacks are gradually increasing in cost because of the increase in cost of the raw gas materials from which they are made and because of the inefficiency of the channel black processes.

In controlling the quality of carbon blacks which are to be compounded into rubber, one important property of the finished rubber product is that of modulus. Carbon black has a marked influence on modulus of the finished rubber product and therefore carbon blacks are commonly referred to in the art as "high modulus" carbon black or "low modulus" carbon black, as though "modulus" were a property of the carbon black itself. Strictly speaking, modulus is not a property of the carbon black but because of the general usage of this term in defining certain carbon blacks the term "high modulus carbon blacks," "low modulus carbon blacks" or "intermediate modulus carbon blacks" as hereinafter employed refer to the property of the rubber in which such carbon black is incorporated. Generally speaking, furnace carbon blacks are usually considered to be high modulus and channel blacks are generally considered to be low modulus although some furnace carbon blacks display properties of modulus in rubber which can cause them to be identified as either intermediate modulus or low modulus carbon blacks.

Another important property of carbon black is referred to as "structure" and although there is usually a close correlation between the structure of a carbon black and the modulus of a rubber product compounded with such carbon black, the terms can not be considered synonymous because it is possible to vary the modulus of a finished rubber product even though the structure of the carbon black compound therewith is the same or substantially the same. Other properties being comparable, high structure carbon blacks usually yield high modulus rubber and low structure carbon blacks usually yield low modulus rubber.

By the term "structure," as applied herein to carbon black, is meant the characteristics of the carbon black particles which relate to flocculation of such particles. The structure is said to be high when there is a strong tendency for the particles to form chains of particles. Conversely, the structure is said to be low when there is little tendency to form such chains.

Since is is not convenient to measure the structure directly, the oil absorption properties of the black are commonly used as a measure of the structure. Determination of oil absorption gives a quick, reliable measure of the structure of the carbon black. It has been found that the oil absorption of the carbon black usually correlates closely with certain properties such as modulus of the rubber having the carbon black compounded therein. It is thus possible to obtain a rapid measure of important properties of the carbon black insofar as rubber compounds compounded with said carbon black are concerned. Furnace carbon blacks usually have an oil absorption value of about 1.35 to 1.45, or higher, cc. of oil per gram of carbon black and such carbon blacks are generally considered to be "high structure" carbon blacks. Carbon blacks made by the channel black process usually have an oil absorption value of about 0.75 to 1.2 cc. of oil per gram of carbon black and such carbon blacks will hereinafter be considered to be "low structure" carbon blacks. Large particle size carbon blacks such as those made by the thermal process have an oil absorption value of about 0.45 to 0.55 cc. of oil per gram of carbon black; however, such carbon blacks are generally not considered useful so far as tire manufacturing is concerned. The oil absorption values herein referred to are determined by the method of ASTM D 281–31, Oil Absorption of Pigments by Spatula Rub-out. Purified raw linseed oil is used and the volume of oil required to convert a known weight of black to a stiff paste or coherent ball is the oil absorption value.

The pH of the carbon black is still another important property. It is known that treatment of the surface of a carbon black with an oxidizing gas can change the properties of the carbon black with respect to its pH and to the relative amounts of volatile matter and oxygen associated with the carbon black. Furnace carbon blacks are generally characterized by having a higher pH value and lesser amounts of oxygen and volatile matter associated therewith than do the channel carbon blacks. Reducing the values of modulus and structure of a furnace carbon black provides certain advantages in the finished rubber product but does not produce a carbon equivalent to, or approximating, channel black because of differences in surface chemistry of the blacks. According to U.S. Patent 3,301,694, Gerard Kraus et al. (assigned to a common assignee Phillips Petroleum Company), there is disclosed a method of producing furnace black having the desirable properties of channel black by treating the carbon black with ozonized air at a temperature below about 480° F. or with nitric acid during the pelleting step. According to this invention, the pH of the carbon black is reduced from a value greater than 9 to a value below 6 and the oxygen and volatile matter content of the furnace black are simultaneously increased.

These low structure acid furnace blacks closely resemble the easy processing channel carbon blacks in such respects as particle size, surface area, color properties and rubber reinforcing qualities and could be used interchangeably with the easy processing channel blacks in otherwise identical rubber compounds.

One object of the present invention is to provide a new and improved blend of furnace carbon blacks whereby the properties of the resulting furnace carbon black blend can be controlled to meet prescribed and predetermined requirements.

Another object is to provide a simple means of compensating for variations in hydrocarbon raw materials and other factors which would normally affect significantly the quality of the black which would otherwise be produced unless expensive and continuous changes and alterations in the furnace equipment or operating conditions were made.

Yet another object is to increase the durability of pneumatic tires.

These and other objects of the invention will become more readily apparent upon the reading of the following description and discussion of my invention.

Broadly the above objects can be achieved by blending a low structure acidic furnace carbon black with a furnace carbon black selected from the group consisting of high abrasion furnace black (HAF), super abrasion furnace black (SAF) and intermediate super abrasion furnace black (ISAF) and subsequently using this blend of blacks as a reinforcing agent in tire tread compositions. The resulting tire vulcanizates possess certain properties that are essentially those imparted by normal structure furnace blacks but in addition have significantly higher tear strength at elevated temperatures. These vulcanizates also display improvements in skid resistance and traction on account of the slightly lower modulus and hardness of those stocks in which these blends of carbon black have been employed.

In general, the present invention is based upon the discovery that a rubber composition to which has been added a mixture of two carbon black components, one of which has a lower modulus value and a lower pH than the second, will have modulus and elongation values which fall linearly with increased percentages of lower modulus carbon black into the mixture. It has also been observed that when the tensile strength of the rubber composition containing the lower modulus carbon black component is lower than that imparted by the second carbon black component, the tensile strength of the composition varies little, if any, from that of the composition containing the second carbon black component provided that the quantity of the lower modulus carbon black is maintained within definite proportions in the blends. But even more significantly, it has been discovered that the resulting composition possesses a tear strength which, in most instances, is higher than the tear strength of either of the compositions which have only one of the carbon black components included therein.

Accordingly, the present invention provides a carbon black blend comprising a mixture of two carbon blacks, the first of which has a lower modulus value and a lower pH than the second and is present in the blend in the range of from 5–50 parts by weight per 100 weight parts of the blend. However, it is preferred that this low modulus carbon black be present in minor proportions, i.e., from 10–30 parts by weight per 100 weight parts of the blend so that the mixture has a preselected modulus value intermediate between the modulus values of the two carbon blacks.

The advantages of this invention may be realized by physically blending these two commercially available carbon blacks one of which has modulus and pH lower and higher, respectively, than the other. As a practical matter, however, the advantages of this invention are readily obtained by directing two streams of carbon black bearing gases in proper proportion, each stream containing a carbon black of preselected surface area, structure, and pH, to a rubber either in solution or emulsion whereby a blended masterbatch of the carbon black having preselected modulus is obtained. In a battery of reactors, therefore, such gas stream blending requires that only a portion of the total number of reactors be controlled for preparing the lower modulus product, while the remaining reactors are employed to obtain the product of lower abrasion loss. Blending carbon black bearing gas streams has the added advantage, moreover, of requiring less critical control than that which is required when all the reactors of the battery are employed to produce a product having a preselected modulus.

One component of my novel carbon black blend is selected from the group consisting of high abrasion furnace black, super abrasion furnace black and intermediate super abrasion furnace black and is prepared by any of the procedures commonly employed in the production of those types of furnace-type carbon blacks. Thus, while all furnace type carbon blacks are, in general, produced by cracking a hydrocarbon using the heat generated by the combustion of a portion of the hydrocarbon and/or by the combustion of a second hydrocarbon, there are various operational procedures by which this result is obtained. These various operational procedures differ primarily in the manner in which the reactants are introduced into the reactor and are well known to those skilled in the art. Such procedures as well as any others by which similar results are obtained may be employed for preparing this particular carbon black component of the blend of the present invention.

As was indicated hereinabove, the lower modulus furnace carbon black is prepared by a process described in a copending application, Ser. No. 386,483.

These carbon blacks are prepared by cracking a hydrocarbon obtained from a petroleum source which is preferably high in aromatic content. Representative of hydrocarbon feedstocks which can be employed are kerosene, gasoline boiling range hydrocarbons, heavy and light naphthas, residual and cycle oils derived from a wide variety of distillation and cracking and reforming operations. By the term hydrocarbon feedstock, as used herein, is meant any of the above. The hydrocarbon fuel employed to generate heat for cracking of feedstock may be the same as or different from the hydrocarbon feedstock. Usually, however, it will be natural gas, when available. The combustion supporting gas employed in the above procedures may be varied but usually will be a gas containing free oxygen such as air, oxygen-enriched air or oxygen employed in amounts sufficient to complete combustion of the hydrocarbon fuel as is well known in the art.

The acidic low structure carbon black which forms one component part of the carbon black blend of our discovery has a surface area of 80–150, preferably 80–120 square meters per gram, a diphenylguanidine adsorption of 30–90 milliequivalents per gram and an oil adsorption as hereinbefore defined of 0.8–1.2, preferably 0.85–1.1 cc. per gram. Such furnace blacks are those which have been oxidized to the desired degree of acidity by an oxidizing agent stronger than air such as $O_3$, $HNO_3$, $SO_2$, $NO_2$, $Cr_2O_3$ and $KMNO_4$. These blacks will have a pH in the range of 1.5–6.

These carbon black blends are employed in admixture with natural and synthetic rubbers and with blends of any of these rubbers. They are of particular importance as reinforcing agents in tire tread compositions in which solution rubbers and blends containing them are utilized in the manufacture of tire carcasses and tire treads.

Solution rubbers are those rubbers which are prepared in hydrocarbon solution in the presence of organometallic catalyst, such as cis-polybutadiene, butadiene/styrene random copolymers, and organolithium polymerized polybutadiene. These solution polymerizations are well known in the art and require no amplification at this time.

Illustrative of rubber blends which can be employed are butadiene-styrene rubber copolymer in blend with cis-polybutadiene, natural rubber in blend with butadiene-styrene random copolymer, butadiene-styrene random copolymer in blend with organolithium polymerized butadiene, and the like.

The following examples illustrate the applicability of this invention in which all parts are by weight unless otherwise indicated. It is to be understood that these examples are merely illustrative of the invention and are not meant to have any limiting effect on the scope thereof.

EXAMPLE I

Blends of cis-polybutadiene (about 95 percent by weight cis) and natural rubber were compounded with intermediate super abrasion furnace carbon black, an acidic low structure furnace carbon black, and a mixture of the two carbon blacks in order to demonstrate the advantage of the furnace black blend on the tear strength of the rubber stock. The acidic low structure furnace carbon black was prepared from a hydrocarbon feedstock with addition of KCl to the carbon-forming zone and then subjected to treatment with 5 weight percent $HNO_3$. Properties of a representative run were as follows: pH, 2.5; oil absorption, cc./gram, 0.94; nitrogen surface area, m.²/g., 84; volatile matter, weight percent, 2.5; diphenylguanidine adsorption, microequivalents/g., 61. The following compounding recipes were used:

| | Parts by Weight | | |
|---|---|---|---|
| | 1 | 2 | 3 |
| cis-Polybutadiene | 60 | 60 | 60 |
| Natural Rubber (#1 Smoked Sheet) | 40 | 40 | 40 |
| Aromatic Oil (Philrich 5) | 18 | 18 | 18 |
| ISAF Carbon Black | 60 | 45 | |
| Acidic Low Structure Furnace Black | | 15 | 60 |
| Zinc Oxide | 3 | 3 | 3 |
| Stearic Acid | 3 | 3 | 3 |
| Flexamine [1] | 1 | 1 | 1 |
| BLE-25 [2] | 1 | 1 | 1 |
| Flexzone 3C [3] | 1.5 | 1.5 | 1.5 |
| Sulfur | 1.5 | 1.5 | 1.5 |
| NOBS Special [4] | 0.9 | 0.9 | 0.9 |

[1] Physical mixture containing 65 percent of a complex diarylamine-ketone reaction product and 35 percent of N,N'-diphenyl-p-phenylenediamine.
[2] High-temperature reaction product of diphenylamine and acetone.
[3] N-isopropyl-N'-phenyl-p-phenylenediamine.
[4] N-oxydiethylene-2-benzothiazolesulfenamide.

The stocks were milled and cured 20 minutes. Results of tear strength determinations were as follows:

| | 1 | 2 | 3 |
|---|---|---|---|
| Tear Strength at 200° F., lb./in.[1] | 315 | 355 | 265 |

[1] ASTM D 624-54. Die A.

The data show a substantial improvement in tear strength at 200° F. in the sample containing the mixture of carbon blacks. The vulcanizate also had a good balance of properties.

EXAMPLE II

Blends of a solution polymerized, 75/25 butadiene/styrene random copolymer and natural rubber were compound with the carbon blacks of Example I in order to demonstrate the advantage of the furnace black blend on this type of rubber stock. The following compounding recipes were used:

| | Parts by Weight | | |
|---|---|---|---|
| | 1 | 2 | 3 |
| Butadiene/Styrene Rubber | 50 | 50 | 50 |
| Natural Rubber (#1 Smoked Sheet) | 50 | 50 | 50 |
| Aromatic Oil (Philrich 5) | 10 | 10 | 10 |
| ISAF Carbon Black | 45 | 35 | |
| Acidic Low Structure Furnace Black | | 10 | 45 |
| Zinc Oxide | 3 | 3 | 3 |
| Stearic Acid | 2 | 2 | 2 |
| BLE-25 | 1 | 1 | 1 |
| Flexzone 3C | 2 | 2 | 2 |
| Sulfur | 1.8 | 1.8 | 1.8 |
| Santocure [1] | 0.9 | 0.9 | 1.0 |

[1] N-cyclohexyl-2-benzothiazolesulfenamide.

The stocks were milled, cured, and physical properties determined. Samples for 200° F. tensile strength and 200° F. tear strength were cured 20 minutes. All other samples were cured 30 minutes. Results were as follows:

| | 1 | 2 | 3 |
|---|---|---|---|
| 300% Modulus, p.s.i.[1] | 1,025 | 970 | 795 |
| Tensile, p.s.i.[1] | 3,515 | 3,580 | 3,400 |
| Elongation, percent [1] | 630 | 630 | 680 |
| 200° F. Tensile, p.s.i.[1] | 2,230 | 2,315 | 1,680 |
| Δ T, ° F.[2] | 50.6 | 49.1 | 47.5 |
| Resilience, percent [3] | 64.0 | 65.8 | 68.2 |
| Shore A Hardness [4] | 58.5 | 57.5 | 54.5 |
| Tear Strength at 200° F., lb./in.[5] | 230 | 265 | 195 |

[1] ASTM D 412-61T.
[2] ASTM D 623-58.
[3] ASTM D 945-59 (modified). Yerzley oscillograph. Test specimen is a cylinder 0.7 inch in diameter and one inch high.
[4] ASTM D 1706-61.
[5] ASTM D 624-54. Die A.

These data again show an improvement in 200° F. tear strength when the mixture of carbon blacks was used. In addition, the vulcanizate in run 2 had a good balance of properties and it had a higher tensile strength (including hot tensile strength) than the other vulcanizates.

EXAMPLE III

A butadiene/styrene random copolymer similar to that used in Example II was blended with natural rubber on a 50/50 weight basis and compounded using the carbon blacks of the preceding examples. The stocks were milled and cured 30 minutes at 307° F. The compounding recipes and results of tear strength determinations were as follows:

COMPOUNDING RECIPES, PARTS BY WEIGHT

|  | 1 | 2 | 3 |
|---|---|---|---|
| Butadiene/Styrene Rubber | 50 | 50 | 50 |
| Smoked Sheet (Natural Rubber) | 50 | 50 | 50 |
| ISAF Carbon Black | 45 | 35 |  |
| Acidic Low Structure Furnace Black |  | 10 | 45 |
| Aromatic Oil (Philrich 5) | 10 | 10 | 10 |
| Zinc Oxide | 3 | 3 | 3 |
| Stearic Acid | 2 | 2 | 2 |
| BLE-25 | 1 | 1 | 1 |
| Flexzone 3C | 2 | 2 | 2 |
| Sulfur | 1.8 | 1.8 | 1.8 |
| Santocure | 1.0 | 1.0 | 1.2 |
| Max. Tear Strength at 200° F., lbs./in. | 280 | 330 | 215 |

These data demonstrate again the improvement in 200° F. tear strength when the mixture of carbon blacks was used. The vulcanizate in run 2 had a good balance of properties as was the case in run 2 of Example II.

Four 10 x 20 truck tires were recapped for rib tear tests with each of the blends molded into one particular tire. One test tire was put on the back wheel of a truck carrying a load of approximately 4000 pounds per tire. The truck was backed slowly, at a low angle, off a concrete curb in a manner such as to put force on the outside rib of the tire. An arbitrary rating scale from 0 to 8 was used as follows:

0—Failure, ribs torn loose.
2—Poor, medium deep tears, greater than 1 inch long.
4—Fair, medium deep tears, less than 1 inch long.
6—Good, small shallow tears.
8—Excellent, no tears.

The rib tear ratings for each composition were as follows (values represent average of four results):

| ISAF, Parts per 100 Parts Rubber | Acidic Low Structure Furnace Black, Parts per 100 Parts Rubber | Rib Tear Rating |
|---|---|---|
| 45 |  | 3.3 |
| 35 | 10 | 7.7 |
|  | 45 | 4.0 |

These data show that the rubber stock containing the carbon black blend had a higher rib tear rating than either of the other compositions.

The above examples clearly illustrate that two furnace carbon blacks, one of which has a lower modulus value and a higher abrasion loss than the other may be blended to form a composition, the modulus value of which falls within the limits of the two components while maintaining the lower abrasion loss. It is to be understood, of course, that the above examples are illustrative only and demonstrate the applicability of this invention to tire treads with respect to a blend of two furnace carbon blacks.

Obviously, many modifications and variations of the present invention are possible in the light of the above teachings. It is therefore to be understood that within the scope of the appended claims the invention may be practiced otherwise than as is specifically described herein.

What I claim is:

1. A process for increasing the tear strength of a vulcanized rubber selected from the group consisting of natural rubber, synthetic rubber, and blends thereof at elevated temperature, which comprises directing a first stream of acidic low structure furnace black into a rubber masterbatch; directing a second stream of a carbon black selected from the group consisting of HAF, ISAF and SAF blacks into the rubber masterbatch; maintaining the ratio of the second stream to first stream of at least 1:1 by weight and curing the resulting rubber-carbon black blend.

2. A process according to claim 1 wherein the rubber is a 50/50 blend of natural rubber and a copolymer of butadiene and styrene.

3. A process according to claim 1 wherein the rubber is a 50/50 blend of natural rubber and polybutadiene.

4. A composition comprising a blend of rubber and a carbon black mixture of an acidic low structure furnace black and a black selected from the group consisting of HAF, ISAF and SAF blacks wherein the acidic low structure furnace black is present in the amount of 5 to 50 parts by weight of the carbon black mixture.

5. A composition according to claim 4 wherein the rubber is a 50/50 blend of natural rubber and a copolymer of butadiene and styrene and the carbon black is a mixture of acidic low structure furnace black and ISAF black wherein the acidic low structure furnace black is present in the amount of 15 parts by weight of the mixture.

6. A composition according to claim 4 wherein the rubber is a 50/50 blend of natural rubber and polybutadiene.

References Cited

UNITED STATES PATENTS 3,257,346  6/1966  Gruver et al. _____ 260—21.5

GEORGE F. LESMES, Primary Examiner.

MURRAY TILLMAN, Examiner.

M. J. TULLY, Assistant Examiner.